United States Patent [19] [11] 4,112,027
Cates [45] Sep. 5, 1978

[54] METHOD FOR INDIRECT EVAPORATIVE COOLING OF UPFLOWING FLUID BY CONTACT WITH DOWNFLOWING WATER FROM OVERLYING EVAPORATIVE COOLING SECTION

[75] Inventor: Robert E. Cates, Leawood, Kans.

[73] Assignee: The Marley Company, Mission, Kans.

[21] Appl. No.: 653,667

[22] Filed: Jan. 30, 1976

[51] Int. Cl.² ............................................. B01F 3/04
[52] U.S. Cl. ............................ 261/151; 165/DIG. 1; 261/111; 261/DIG. 11; 261/DIG. 77
[58] Field of Search .............. 261/147, 151, DIG. 11, 261/138, 111, 152, 155–157, DIG. 77; 165/DIG. 1, 60, 61

[56] References Cited

U.S. PATENT DOCUMENTS

| 2,110,203 | 3/1938 | Crawford | 261/147 X |
| 2,247,514 | 7/1941 | Mart | 261/147 |
| 2,507,604 | 5/1950 | Lawson | 261/DIG. 11 |
| 2,606,008 | 8/1952 | Laubach | 261/DIG. 11 |
| 3,290,025 | 12/1966 | Engalitcheff, Jr. | 261/DIG. 11 |
| 3,820,353 | 6/1974 | Shiraishi et al. | 261/DIG. 11 |
| 3,854,909 | 12/1974 | Hoisington et al. | 261/DIG. 11 |
| 3,864,442 | 2/1975 | Percy | 261/DIG. 11 |

Primary Examiner—Richard L. Chiesa
Attorney, Agent, or Firm—Schmidt, Johnson, Hovey & Williams

[57] ABSTRACT

A high efficiency, induced draft, combination counterflow-crossflow fluid cooling apparatus and method is provided which gives unexpectedly enhanced cooling of hot fluid by causing the fluid to pass upwardly through a series of serpentine heat exchange conduits in primarily countercurrent, indirect sensible heat exchange relationship with external cooling water gravitating from an overlying evaporative water cooling section. Crossflowing air currents are pulled through the apparatus to evaporatively cool the water not only in the upper cooling section but also in the sensible heat exchange area as well. Countercurrent flow of coolant water and fluid to be collected ensures that the coldest water and coldest fluid are in thermal interchange during the final stages of fluid cooling at the upper ends of the heat exchange conduits, so that the fluid temperature can approach that of the cold water as opposed to approaching the temperature of heated water found adjacent the lower ends of the conduits, which is conventional in cocurrent fluid units of this type. The fluid conduit system is preferably arranged for causing increased fluid residence time, and thereby greatest temperature difference and longer heat exchange between the fluid and coolant water adjacent the air inlet of the apparatus where air and coolant water temperatures are lowest relative to the fluid to be cooled, so that an ideal countercurrent flow relationship is obtained and maximum heat transfer is assured. An underlying water collection basin is also employed in the apparatus which is constructed to permit collection of cooling water to a level above that of the lowermost portions of the hot fluid conduits, in order to allow the hot fluid traveling through the conduits to heat the collected water to prevent freezing thereof during wintertime operations when the internal water pump is shut down causing the stoppage of all evaporative cooling and hence a raising of the lower water basin level.

3 Claims, 4 Drawing Figures

METHOD FOR INDIRECT EVAPORATIVE COOLING OF UPFLOWING FLUID BY CONTACT WITH DOWNFLOWING WATER FROM OVERLYING EVAPORATIVE COOLING SECTION

The present invention is concerned with a combination counterflow-crossflow fluid cooling apparatus which includes a lower, multiple conduit, indirect fluid cooling section in conjunction with an overlying evaporative water cooling section which is designed to deliver quantities of cooled water for gravitational flow over the fluid cooling section in order to cool hot fluid passing therethrough by process of indirect sensible heat exchange, while cross-flowing air currents are directed through the apparatus for evaporative cooling of the descending water throughout the entire height thereof. More particularly, it is concerned with such a counterflow-crossflow fluid cooling apparatus and method which achieves unexpectedly high levels of cooling efficiency by directing initially hot fluid generally upwardly through the lower fluid cooling section in countercurrent indirect sensible heat exchange relationship with the external cooling water and in a manner for ensuring that the coldest water and coldest fluid are in thermal interchange during the final stages of fluid cooling. This flow arrangement allows the fluid temperature to approach that of the cold water rather than that of the hot water so that cooling thereof is maximized. In addition, the conduit system is constructed and arranged for causing the greatest fluid residence time to occur in the conduits which are in thermal contact with the coldest air and cooling water, which in turn provides a flow-temperature difference segregation giving an ideal countercurrent flow relationship where not only is the coldest cooling water adjacent the coldest fluid and the hottest cooling water adjacent the hottest fluid but equally as important, the flow rate of the fluid through the heat exchange conduits is maintained the lowest in connection with the coldest ambient air and external cooling water for most efficient operation per unit area of heat exchange surface available in the fluid cooling section.

A wide variety of relatively small fluid cooling devices have been proposed in the past for use with air conditioning units or other systems requiring cyclic fluid cooling. In many cases the size of the fluid cooler becomes important since these units are oftentimes mounted on the roofs of large buildings, and accordingly the weight and bulkiness of the cooler is an important consideration. Thus, the greatest possible cooling efficiency from the smallest possible package is a prime requisite in fluid coolers of this type.

One class of known fluid coolers in the nature of an evaporative condenser employs a more or less conventional, fluid-conveying conduit system for indirect cooling of a fluid, in conjunction with an overlying evaporative water cooling section. A coil shed cooling tower of this type is illustrated for example in U.S. Pat. No. 2,247,514 to L. T. Mart. In these units water is cooled in the upper evaporative section and allowed to gravitate over in impinging relationship to the underlying fluid conduits in order to cool the fluid therein by indirect thermal interchange. Such units are equipped with fan means for directing cooling air currents through both the evaporative fill and conduit section. This not only serves to cool the water in the evaporative section, but also cools the water to a certain extent as it gravitates through the underlying conduit or coil section. The cooling water is recycled as necessary through the use of recycle conduits and pumps, so that the water is successively cooled, heated and recooled during operation of the fluid cooler.

Such prior units have without known exception employed header structure or the like for directing the initially hot quantities of fluid to the upper end of the conduit section while the cooled fluid is returned to the point of use from the lower extremity of the conduits. By virtue of this construction, it is to be seen that the coldest cooling water coming from the evaporative water cooling section initially contacts the hottest portions of the fluid in the upper ends of the conduits, so that a large proportion of the total cooling is achieved in the upper portion of the conduit section. This arrangement also causes the flow of fluid through the coil section to be essentially cocurrent with the flow of gravitating cooling water, as opposed to counterflow.

Although units of the type described above have achieved a certain degree of acceptance in the art, a number of problems still remain. First of all, in fluid coolers, as is the case with all types of heat exchange apparatus, it is of course desirable to increase the total performance of the cooler, i.e., the amount of heat transfer obtainable as it relates to the size of the unit and the power input thereto. Thus, from an economic standpoint it is important to achieve the greatest heat transfer with the smallest size unit and with a minimum of power input.

Another problem encountered with prior fluid coolers stems from freezing of the cooling water during wintertime operations when ambient conditions permit or dictate use of the fluid cooler as strictly an air cooling unit. In these instances the cooling water collected in the lower water basin can freeze and thus preclude water cooling operations in the event that a transitory high heat load is imposed on the fluid cooler.

It is therefore the most important object of the present invention to provide a high efficiency, combination counterflow-crossflow fluid cooling apparatus and method which gives excellent total cooling performance in a relatively small unit and with a minimum of power input through provision of a multiple-conduit indirect sensible fluid cooling section having means for directing the flow of hot fluid in an upward direction through the conduits in countercurrent, indirect sensible heat exchange to the descending flow of external cooling water coming from an overlying evaporative water cooling section. In this fashion the coldest fluid adjacent the top of the conduit section comes into indirect thermal interchange with the coldest water gravitating from the upper water cooling section so that during the final stages of fluid cooling the temperature of the fluid can approach that of the coldest water, as opposed to approaching the temperature of heated water found adjacent the lower ends of the conduits.

Another aim of the invention is to provide a fluid cooling apparatus of the type described which incorporates the benefits and advantages of both crossflow and counterflow cooling techniques by provision of means for establishing a counterflow pattern between the upflowing hot fluid and downflowing cooling water so as to take advantage of the maximum cooling characteristics of a counterflow heat exchanger; on the other hand, the use of an upper evaporative water cooling section of crossflow design allows cooling of the initially hot water gravitating therethrough under more favorable overall conditions and total cost factors than would be possible with a pure counterflow arrangement. Provision of the preferred induced draft fan in conjunction with the stacked cooling sections not only serves to cool the water in the evaporative crossflow section, but also to cool the external water as it gravitates over and impinges upon the external surfaces of the conduits in the lower fluid cooling section.

Another object of the invention is to provide a two-section fluid cooler having an upper evaporative water cooling section and a lower indirect fluid cooling section wherein inlet and outlet headers having serpentine conduits therebetween are arranged in the fluid cooling section for increasing fluid residence time in the conduit sections adjacent the air inlet of the apparatus where the coldest cooling air and water pass through the fluid cooling section; in this manner the conduits having the greatest fluid temperature range (initial fluid temperature at bottom minus the fluid temperature at the top) are in thermal contact with the coldest coolant for the longest cooling period, while the hotter fluid is in contact with the hottest cooling air and water for a shorter time. This ensures that an idealized countercurrent flow-temperature relationship is established in the fluid cooling section in order to further enhance fluid cooling capabilities.

A still further object of the invention is to provide an induced draft, indirect, multiple conduit fluid cooler having efficient, inexpensive means for overcoming the problem of freezing of collected cooling water which can occur during wintertime operations when the water cooling phase of the fluid cooler is shut down and cooling is accomplished solely by air cooling; in this connection, an underlying cooling water collection basin beneath the fluid cooling section is preferably provided which has correlated pump and return water equipment which in conjunction with upstanding walls of an appropriate height causes water to collect in the basin upon shutdown of the pump, to a level to cover at least a portion of certain of the hot fluid conveying conduits of the fluid cooling section. This in turn allows the hot fluid traveling through the conduits to heat the collected cooling water and prevent freezing thereof.

Figure 1:
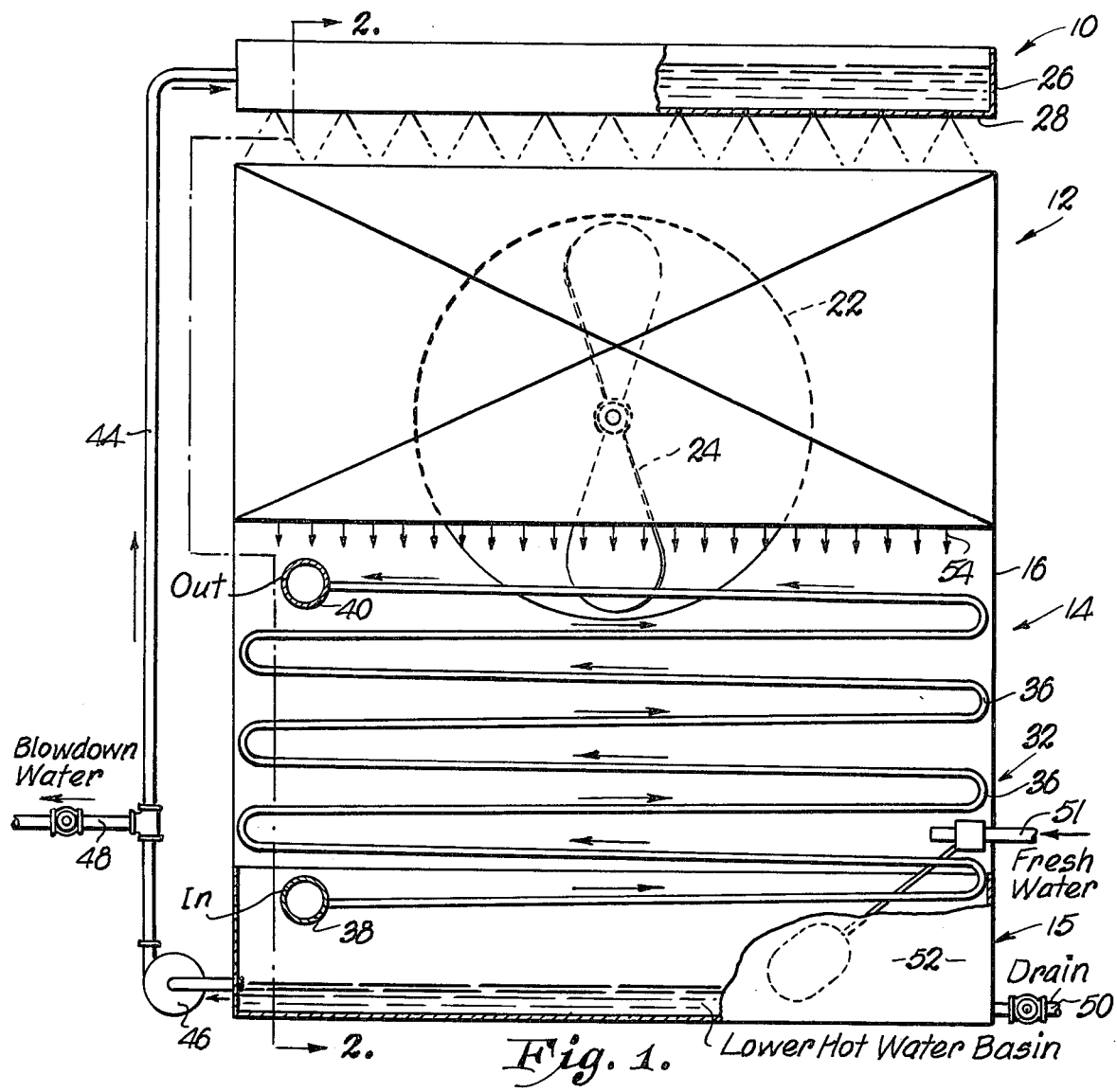
FIG. 1 is a generally schematic end elevational view of fluid cooling apparatus embodying the principals of the present invention, showing the air inlet face of the apparatus and with portions of the upper and lower basins broken away for clarity.
Figure 3:
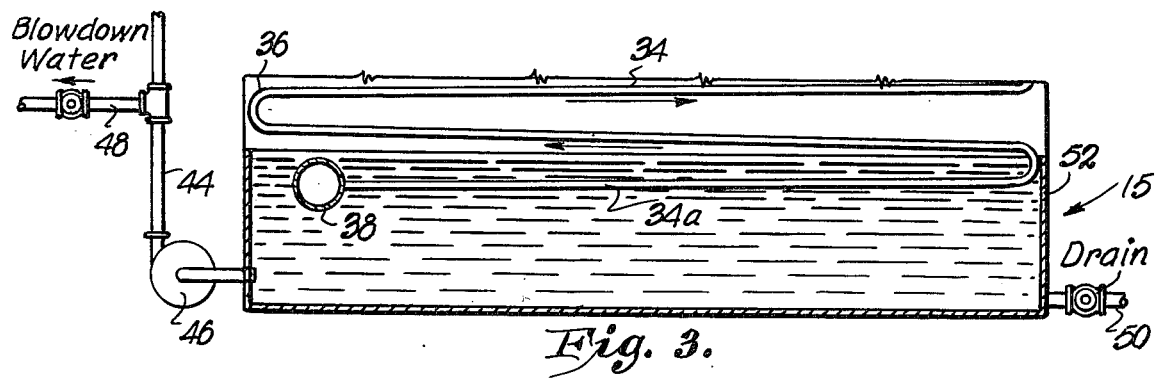
Figure 2:
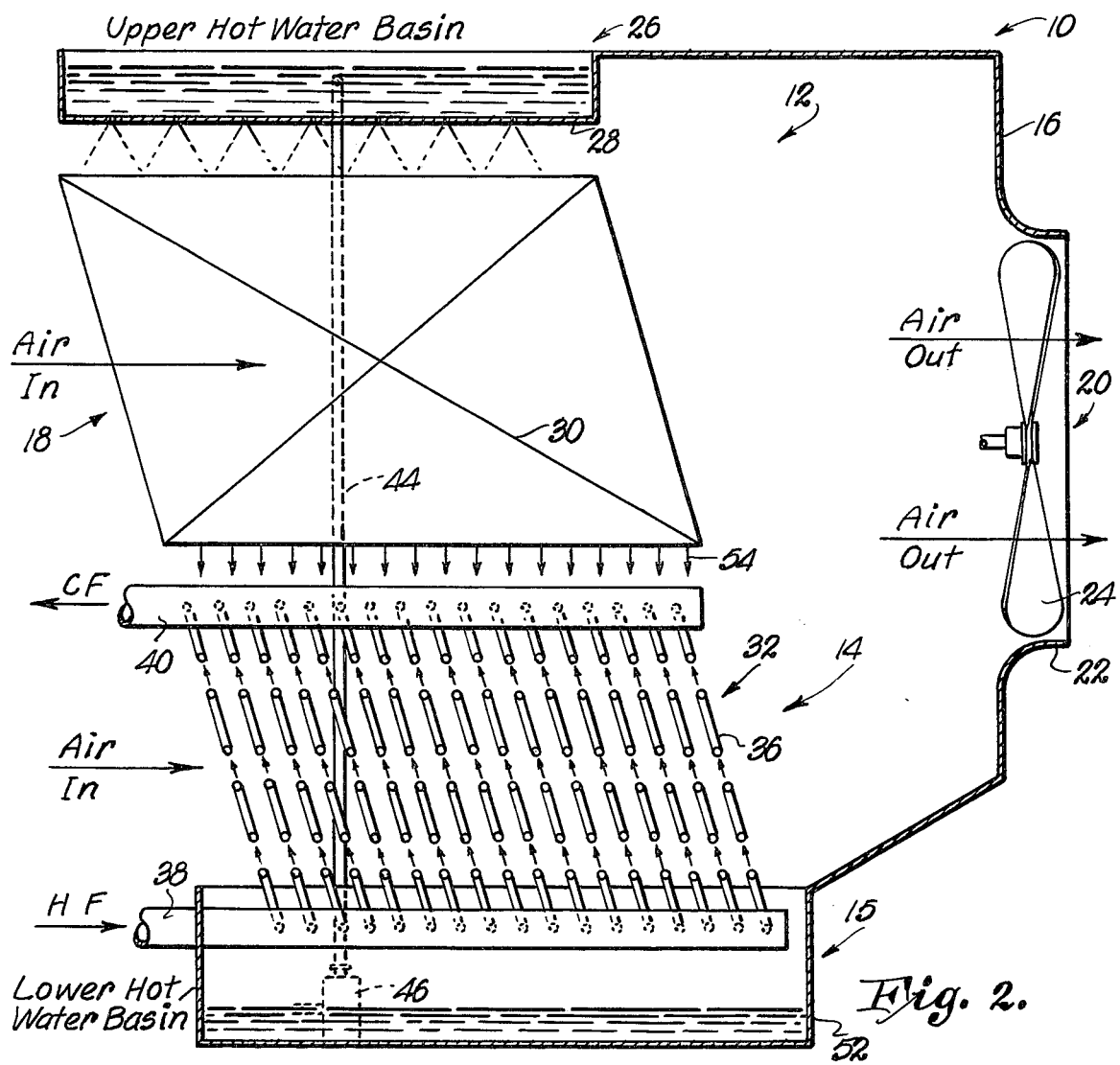
FIG. 2 is a vertical sectional view of the apparatus taken essentially along line 2—2 of FIG. 1.
Figure 4:
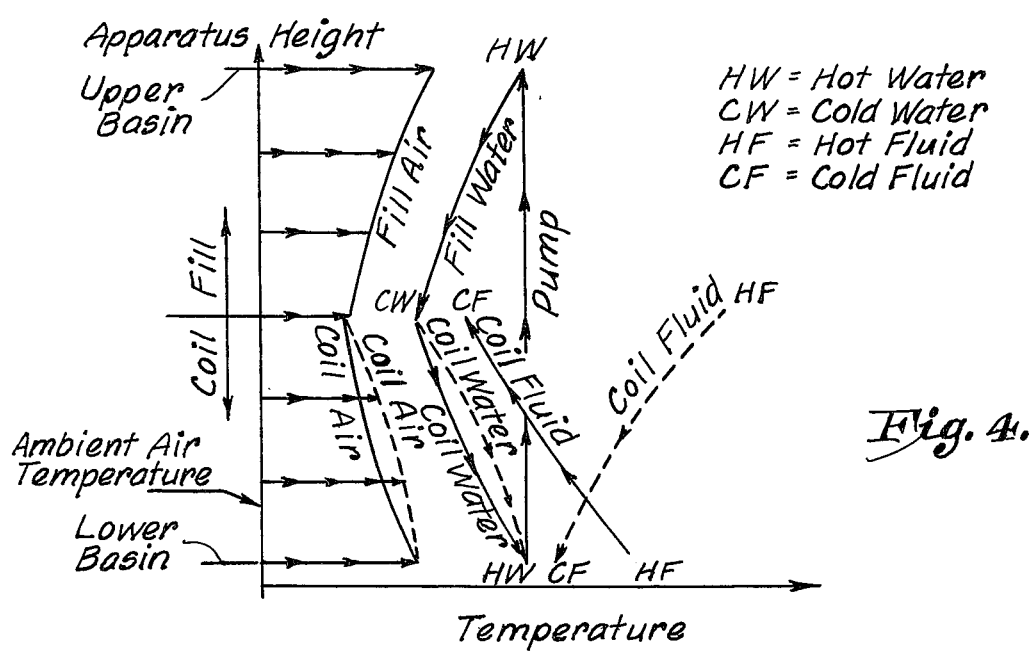

FIG. 3 is a fragmentary view in partial vertical section depicting the lower end of the apparatus shown in FIGS. 1 and 2 during wintertime operations wherein the lowermost conduit sections are operable to prevent freezing of water which has collected in the lower basin to a higher level than is the case during operation of the evaporative section; and FIG. 4 is a graphical representation illustrating the cooling characteristics of a fluid cooler in accordance with the invention, as compared with a fluid cooler of this type using cocurrent top-to-bottom flow of the hot fluid and cooling water through the lower conduit section.

Fluid cooling apparatus 10 in accordance with the invention broadly includes an upper, evaporative water cooling section 12, an underlying, multiple conduit indirect fluid cooling section 14, and a lowermost water collection basin 15. The sections 12 and 14 are in stacked, generally superposed disposition and are situated within conventional casing structure 16 which defines an air inlet face 18 and an air outlet 20. Inlet face 18 extends substantially from top to bottom and side to side of apparatus 10, while outlet 20 is in the form of an annular opening 22 which houses a mechanically powered induced-draft fan 24.

In more detail, water cooling section 12 includes a conventional, uppermost hot water distributor or basin 26 which is provided with an apertured bottom wall 28 for permitting dispersal and gravitation of water collected within the distributor 26 through apparatus 10. Cooling means 30 is positioned beneath distributor 26 and serves to disperse hot water coming from the latter for enhancing evaporative cooling thereof by crossflowing air currents pulled through section 12. Although schematically illustrated in the drawings, it is to be understood that cooling means 30 can be of substantially any construction, but preferably is selected from any one of a number of well-known evaporative fill structures such as horizontal splash bars or spaced, vertically oriented film-type fill elements.

Fluid cooling section 14 includes a plurality of horizontally spaced, upright, inclined, hot fluid-conveying metallic conduits 32 which cooperatively present a bank thereof. As best shown in FIG. 1, each conduit 32 is a continuous element which is of serpentine configuration and includes a series of vertically spaced, generally horizontally extending sections 34 which are interconnected by arcuate end portions 36. Moreover, the lowermost ends of each of the spaced conduits are interconnected to and in communication with a lower manifold or header 38 which serves as a hot fluid inlet to the respective conduits 32. A similar manifold or header 40 is connected to the upper ends of the conduits 32 and serves as an outlet for conveying fluid cooled within section 14 from apparatus 10. Fluid flow between headers 38 and 40 is slowest adjacent the inlet and outlets respectively of the latter and fastest in farthest proximity therefrom, thus producing the greatest fluid residence time in the serpentine coils 32 closest to the air inlet face 18 of the fluid cooler apparatus 10.

Water collection basin 15 is situated below the bank of fluid conveying conduits 32 and is disposed for collecting water gravitating therefrom as will be explained. In addition, a vertically extending recycle conduit or pipe 44 is operatively interconnected between collection basin 15 and upper hot water distribution basin 26 for the purpose of permitting recycle of the water collected within basin 15 to the top of apparatus 10. A recycle pump is interposed within pipe 44 for pumping of the recycle water to basin 26. A valve-controlled blowdown water line 48 is connected to line 44 to prevent mineral accumulation in the cooling water during the operation of apparatus 10, and a valved drain pipe 50 is connected to basin 15 for permitting emptying of the collection basin as desired. Float valve-controlled water supply line 51 empties into collection basin above the upper level thereof to compensate for blowdown losses and to refill the system after complete drainage.

It should also be noted that lower collection basin 15 includes upstanding sidewalls 52 which are of sufficient height to permit collection of water therein to a level for covering portions of the respective conduits 32. As best seen in FIG. 3, the sidewalls 52 of basin 42 preferably permit collection of water within the latter to a level for covering the lowermost horizontal sections 34a of the conduits 32 as well as inlet-defining header 38. This configuration of basin 42 is important for precluding wintertime freezing of water within the basin, as will be explained in detail hereinafter.

Apparatus 10 has many uses in the heat exchange field. For example, it may be used to cool water flowing in a closed circuit which is employed at a site remote from the cooler to condense or otherwise cool a refrigerant. Fluid other than water may also be cooled with facility for use at a location spaced from the fluid cooler itself.

The continuous operation of apparatus 10 in cooling a fluid such as for example hot water proceeds as follows. First, the cooling water within upper basin 26 gravitates through the fill structure therebelow which has the effect of breaking up or dispersing the water in a well-known manner to increase the surface area thereof as well as enhance the time of exposure to ambient-derived air. At the same time, air currents pulled through apparatus 10 by fan 24 serve to evaporatively cool the water descending through the fill structure. When this water is cooled to a maximum extent it gravitates from the fill (see arrow 54) directly into the underlying fluid cooling section 14. During gravitation through this section, the cooling water impinges upon the external surfaces of the conduits 32 for causing indirect sensible heat exchange between the cooled water and the hot fluid therein. In this regard, it is important to note that the hot fluid is directed through header 38 to the bottom of the respective conduits 32, whereupon the fluid passes upwardly through the adjacent conduits towards and into header 40. At this point the fluid is returned to the site of use in a cooled condition. Thus, it will be seen that during the generally upward travel of this fluid within the conduits, the latter is indirectly cooled by the descending water from evaporative water cooling section 12, and consequently the external cooling water is itself heated. In addition however, cooling is effected by ambient-derived air currents induced by fan 24 which pass through the multiple-conduit fluid cooling section 14. This serves to evaporatively cool, at least to a certain extent, the cooling water gravitating through section 14 as it is indirectly heated by the hot fluid within the conduits 32. Thus, it will be appreciated that in section 14, a primarily counterflow cooling arrangement is provided between the fluid within the conduits and the descending external cooling water; on the other hand, a crossflow arrangement is presented between the descending cooling water and the currents of ambient derived air pulled through sections 12 and 14.

The water gravitating from section 14 in a heated condition is collected within basin 15 as illustrated. In normal operations with apparatus 10, pump 46 will be employed to recycle this collected water back to upper basin 26 so that the water can be recooled in section 12 and again used to cool the hot fluid in section 14. Makeup water can be supplied to the cooling water system of apparatus 10 as needed through line 48, and blowdown water can be drained from basin 15 as desired through line 50 in order to prevent the undesirable buildup of minerals or other contaminants in the water system.

During certain wintertime operating conditions when ambient temperatures are relatively low, it may be feasible or essential to operate apparatus 10 as a completely "dry" indirect heat exchanger, i.e., without water cooling of the fluid flowing through the conduits section 14. A problem has arisen in the past with evaporative condensers and the like because water collected in the underlying basin during air only operations, tended to freeze and could not be used for cooling purposes in the event that a high heat load is temporarily placed on apparatus 10. Freezing of the collected water also had an adverse effect on the operating components of the cooler. In order to overcome this problem, the pump and return line components have been constructed and arranged and the sidewalls 52 of basin 15 have been configured to cause collection of water in the basin to a level to cover the lowermost sections 34a of the respective fluid conduits 32 when the pump 46 is turned off and the apparatus contains a normal amount of cooling water. As best seen in FIG. 3, during such dry operating conditions with apparatus 10, the cooling water within basin 15 is heated by virtue of the passage of the hot fluid through inlet header 38 and the sections 34a of the spaced conduits 32. This effectively serves to prevent freezing of water within basin 15 and thus enhances the usefulness of apparatus 10.

A very important feature of the present invention resides in the fact that the hot fluid directed to section 14 enters at the lower end of the conduits and travels upwardly therethrough in primarily counterflow relationship to the external cooling water. Thus, it will be seen that at the upper end of section 14 the coldest fluid (which has been cooled during upward travel through the serpentine conduits) comes into indirect thermal interchange with the coldest water from overlying section 12, which has not previously been subjected to indirect heating by the fluid. In essence, this flow pattern represent a reversal of the flow arrangement which would normally be expected to give the greatest cooling effect, i.e., passing the hottest fluid through the upper ends of the conduits for heat exchange with the coldest water from section 12, with resulting cocurrent flow of hot fluid and cooling water. Contrary to these expectations however, it has been found that the apparatus and method in accordance with the present invention gives enhanced cooling of the initially hot fluid as compared with a cocurrent flow unit of this type. In essence, it is believed that this phenomenon obtains by virtue of the fact that the fluid temperature, in the final stages of cooling within the upper portion of section 14, approaches the temperature of the cold water. Since this latter temperature represents the lowest limits to which the fluid can be cooled, maximum cooling with minimum equipment is obtained. On the other hand, with a cocurrent flow unit, the temperature of the fluid, during the final stages of cooling adjacent the lower ends of the conduits, can only approach the temperature of the hot water leaving the conduit section which has been heated during travel of the section. Thus, in the latter case, the fluid temperature can approach only the higher temperature of the heated water, and this approach temperature is of course higher than the temperature of the cold water entering the upper part of fluid cooling section 14.

The above comparison is graphically illustrated in FIG. 4, wherein plots of temperature versus apparatus height are presented for the air, fluid and water passing through apparatus having identically sized evaporative and coil sections, and with the same air, fluid and water flow rates. In the plot the solid lines represent the flow of air, cooling water and fluid through an apparatus 10 in accordance with the invention, that is, where the fluid enters at the lower end of the conduit section and counter-currently travels upwardly therethrough so that the coldest fluid is in thermal interchange with the coldest cooling water at the upper end of section 14. On the other hand, the dotted lines represent the temperature characteristics which would obtain in a unit wherein the hot fluid enters at the upper end of section 14 and travels in cocurrent relationship with the gravitating cooling water.

In more detail, it will be seen that in the full line representation of FIG. 4 the hot fluid entering adjacent the lower end of section 14 is cooled during travel through the latter and ultimately, at the upper end of the conduit section, approaches the temperature of the cold water gravitating from the fill structure of section 12 thereabove.

In contrast to the foregoing, it will be seen in the dotted line representation of such figure that the hot fluid enters at the upper end of section 14, is cooled during downflowing passage therethrough, and, at the lower end of section 14, the temperature of the fluid approaches that of the water leaving the section, which of course has been heated during its passage through section 14. Therefore, since in both instances the temperature of the water during the final fluid cooling stages represents the lowest temperature which can be achieved by the fluid, it will be apparent that in the present invention lower final fluid temperatures are obtainable. This more efficient cooling results notwithstanding the fact that in heretofore used cocurrent flow methods and apparatus the large temperature difference which exists initially between the hot fluid and cooling water would normally be considered as advantageous in producing the greatest cooling effect.

Another important feature of the present invention which greatly facilitates cooling of fluid stems from the arrangement of the conduit section 14. In particular, the headers 38 and 40, as well as the conduits 32, are preferably configured so that the longest fluid residence time occurs in the conduits adjacent the air inlet face 18 of apparatus 10, and the least fluid residence time takes place in the conduits adjacent fan 24. This in turn means that the greatest incremental fluid cooling occurs in the conduits adjacent face 18, so that the temperature differential or "range" (i.e., the difference between the temperature of the fluid at the bottom of the conduit and that at the top) is greatest where the entering air temperature and to some extent the coolant water temperature is the lowest. In addition, the arrangement depicted assures that the flow of fluid is slowest where the cooling is most effective. Although the temperature range decreases in the conduits more remote from the air inlet and thus less incremental cooling occurs therein, faster fluid flow rates are of lesser consequence. Since the coldest water from a crossflow-type evaporative cooler is produced adjacent the air inlet face thereof, it can be recognized that this coldest water descends and serves to cool those conduits adjacent face 18. Moreover, unheated air currents produced by fan 24 pass over the initial conduits 32 and have at this point the greatest cooling effect. This combination of factors within apparatus 10 in essence presents an ideal countercurrent flow relationship where the hottest coolant is in thermal interchange with the hottest fluids to be cooled, and conversely the coldest coolant is in thermal interchange with the coldest fluid to be cooled. The cooling efficiency of apparatus 10 is thereby significantly increased.

It will be recognized from the foregoing that apparatus 10 takes advantage of the desirable features of both crossflow evaporative and counterflow sensible cooling arrangements to produce the greatest fluid cooling. In the upper water cooling section 12 a pure evaporative crossflow cooler is provided, and this gives predictable water cooling performance at reasonable cost in terms of construction and power input. On the other hand an idealized primarily counterflow heat transfer is produced between the cooling water and upflowing fluid which allows the fluid during final cooling thereof to approach the temperature of the coldest cooling water.

Having thus described the invention, what is claimed as new and desired to be secured by Letters Patent is:

1. A method of cooling quantities of initially hot fluid comprising the steps of:
   providing a fluid cooling section having a plurality of elongated, enclosed, fluid-conveying conduits which extend generally from the lower end of said section to the upper end thereof;
   successively directing quantities of initially hot fluid in one direction along a first path for entry into successive lower ends of said conduits;
   passing the fluid generally upwardly through said conduits;
   removing the fluid from successive upper ends of said conduits and directing the same along a second path generally parallel to said first path and in a direction opposite to said one direction;
   cooling the fluid during travel thereof through said conduits by causing cooling water to gravitate from the upper end of said fluid cooling section downwardly through the latter in primarily counterflow relationship to the generally upward flow of said fluid, with the cooling water impinging upon the external surfaces of said conduits for indirect sensible heat exchange between the cooling water and fluid through the walls of said conduits, whereby the coldest water entering the upper end of said fluid cooling sections comes into indirect thermal interchange relationship with the coldest portions of said fluid adjacent the upper end of said fluid cooling section;
   directing ambient-derived air currents through said fluid cooling section during said gravitation of cooling water therethrough in a direction generally parallel to and the same as said one direction to cause the greatest fluid residence time to occur in the conduits adjacent the area where said ambient-derived air currents first enter the fluid cooling section and the coldest water impinges thereon; and
   cooling said cooling water prior to the gravitation thereof through said fluid cooling section by allowing the water to gravitate through a water cooling section situated above said fluid cooling section which includes evaporative fill structure serving to disperse the water, and simultaneously passing currents of air through said water cooling section for evaporative cooling of the cooling water.

2. The method as set forth in claim 1 including the steps of: collecting the water gravitating from said fluid cooling section, recycling the collected water back to said water cooling section for cooling of the water therein, and allowing the cooled, recycled water to gravitate through the fluid cooling section.

3. The method as set forth in claim 1 including the step of directing ambient-derived air currents simultaneously through both said fluid cooling section and water cooling section in generally crossflow, intersecting relationship to the gravitational flow of water through the respective sections.

* * * * *